May 3, 1938. A. MAAS 2,116,440
PRIME MOVER CONTROL MECHANISM
Filed April 1, 1937
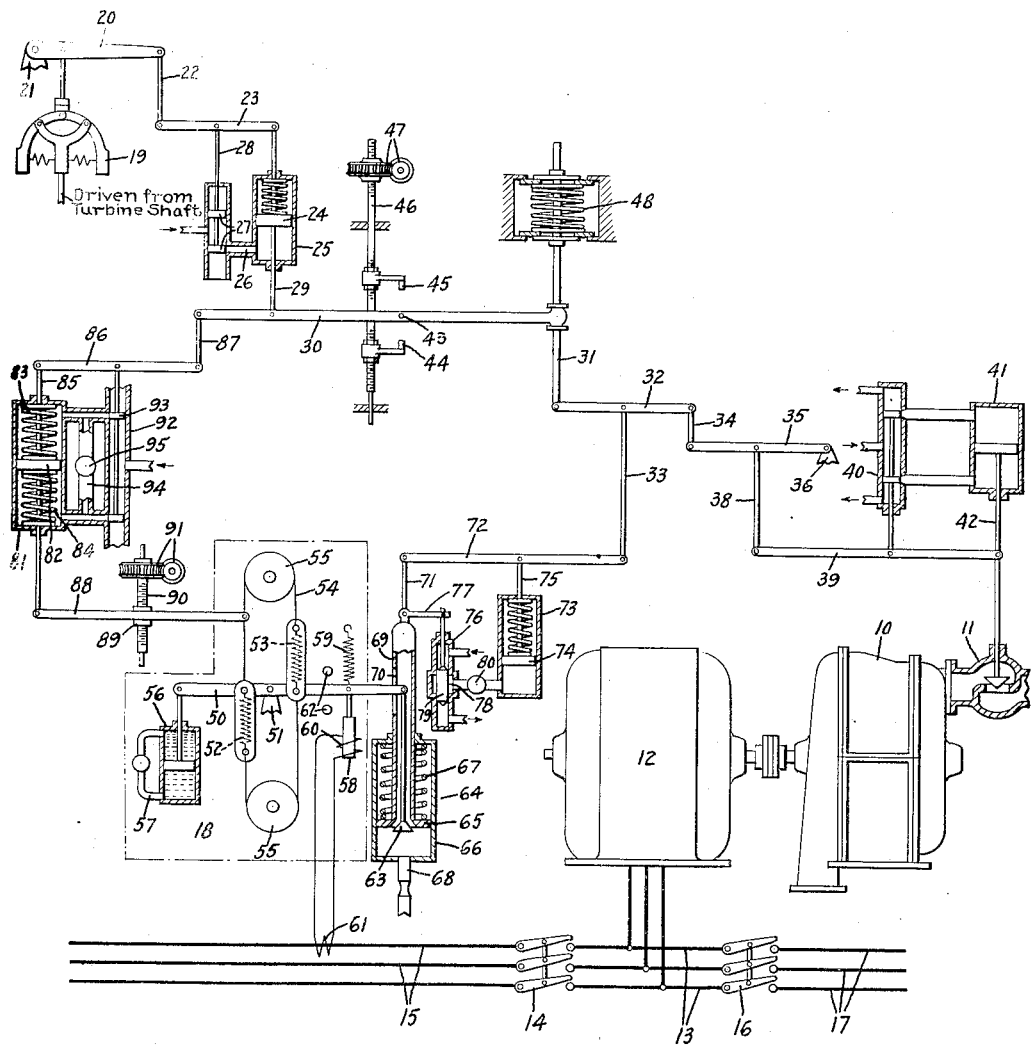
Inventor
Arnold Maas,
by Harry E. Dunlap
His Attorney.

Patented May 3, 1938

2,116,440

UNITED STATES PATENT OFFICE 2,116,440

PRIME MOVER CONTROL MECHANISM

Arnold Maas, Berlin-Tegel, Germany, assignor to General Electric Company, a corporation of New York Application April 1, 1937, Serial No. 134,401
In Germany April 17, 1936

6 Claims. (Cl. 290—40)

The present invention relates to prime mover control mechanisms, more specifically to mechanisms for controlling prime mover driven generators, such as turbo-generators where the generator is connected to a secondary electric line from which a constant load is to be supplied to a main line or to which a constant load is to be supplied from such main line.

Mechanisms of this type heretofore used usually included a load regulator responsive to load changes in the line and a speed regulator adjusted to be inoperative under normal conditions and to act only as a speed safety regulator. Such arrangement, however, has the drawback that in case of certain disturbances in the main line and a sudden increase in demand for current, the load regulator prevents an increased current output of the generator and may even disconnect the prime mover of the generator so that even the current supply for the secondary line is interrupted.

The object of the present invention is to provide an improved construction and arrangement of governing mechanisms whereby the aforementioned drawback is overcome. This is accomplished with my invention by the provision of a speed regulator which is arranged to limit the load output in both directions so that in case the speed drops to a certain fixed value the speed regulator effects an increase of the flow of operating medium to the prime mover against the effect of the load regulator.

For a better understanding of what I consider novel and my invention, attention is directed to the following description and the claims appended thereto in connection with the accompanying drawing.

The single figure of the drawing shows a governing mechanism somewhat diagrammatic, embodying my invention.

The arrangement shown in the drawing comprises a prime mover, in the present instance shown as an elastic fluid turbine 10 having an inlet valve 11 and arranged to drive an A. C. generator 12 from which energy is supplied to a power line 13 connected by a switch 14 to a main line 15 and by another switch 16 to a secondary line 17.

My invention comprises an improved governing mechanism for controlling the flow of elastic fluid to the turbine 10 in order to maintain constant the load in the line 15, that is, with varying load demand from the secondary line 17 the output of the generator 12 is to be varied so that the supply of load from the main line 15 to the line 13 or vice versa remains constant.

Briefly, my governing mechanism includes a load governor 18 and a speed governor 19 which, as will be more fully understood from the following, may be operated simultaneously or independently. The arrangement is such that during small changes in load in the main line 15, which changes do not affect the frequency in this line, the turbine valve 11 is controlled by the load governor 18, the speed governor 19 remaining inoperative. During greater load changes, effecting speed changes and movement of the speed governor, control of the turbine valve 11 is effected by the speed governor 19 through the intermediary of the load governor 18. Finally, during sudden considerable load changes or rather changes in frequency in the line 15 effecting considerable movement of the speed governor 19, movement of the turbine valve 11 is effected by the speed governor directly.

Referring now more in detail to the arrangement shown in the drawing, it will be noted that the speed governor 19 is connected to an intermediate point of a lever 20 connected at the left hand end to a fulcrum 21 and at its right hand end by a link 22 to a floating lever 23. The right hand end of the floating lever 23 is connected to a piston 24 of a hydraulic motor 25. Actuating fluid under pressure is supplied to the motor 25 through a port 26 and this supply is controlled by a pilot valve 27 having a stem 28 connected to an intermediate point of the floating lever 23. The piston 24 has a stem 29 which at its lower end is connected to an intermediate point of a lever 30. With this arrangement, it will be noted that an increase in speed causes downward movement of the right hand end of the lever 20 and a downward movement of the pilot valve heads 27, permitting supply of actuating fluid to the lower side of the piston 24 whereby the latter is forced upward and causes upward movement of the lever 30. The lever 30 is pivotally connected at its right hand end to a rod 31 which in turn is connected to a lever 32. The latter has an intermediate point pivoted to a link 33 and a right hand end connected by a link 34 to the left hand end of a lever 35 supported on its right hand end on a fulcrum 36 and connected at an intermediate point by a link 38 to the left hand end of a lever 39. The lever 39 is connected to a pilot valve 40. The latter controls the flow of actuating fluid to and from a hydraulic motor 41 having a piston 42 connected to the turbine inlet valve 11.

The lever 30 has an intermediate point 43. Assuming that the lever 30 is fulcrumed at the point 43 and assuming further that the connection between the link 33 and the lever 32 acts as a fulcrum, then the operation of the mechanism is as follows: As pointed out above, an increasing governor speed causes upward movement of the stem 29 of the hydraulic motor 25. With the lever 30 turning about the point 43 this causes downward movement of the link 31 connected to the right hand end of the lever 30 and consequently turning movement of the lever 32 in counter-clockwise direction whereby link 34 and link 38 are moved upward, causing upward movement of the pilot valve 40 and resulting in the supply of actuating fluid to the upper part of the hydraulic motor 41 and the discharge of actuating fluid from the lower part thereof whereby the piston of said hydraulic motor is moved downward, causing closing movement of the valve. Thus, an increase in speed effects closing movement of the turbine valve and, as will be readily seen, a decrease in speed effects opening movement of the turbine valve 11.

In the operation just described, the speed governor 19 acted directly on the turbine valve and not through the intermediary of the load governor 18. Such direct action of the speed governor of the turbine valve is normally undesirable, it being preferable to have the turbine valve 11 primarily under the control of the load governor 18 and in case of normal speed changes to effect movement of the turbine valve 11 by the speed governor through the intermediary of the load governor. In order to prevent such direct action of the speed governor 19 on the turbine valve 11, the aforementioned point 43 of the lever 30 is arranged between two movable stops 44 and 45 held on a screw-threaded rod 46 which may be rotated by means including a worm gear 47. The threads for the stops 44 and 45 are left hand and right hand respectively so that during rotation of the rod 46 in one direction, the stops 44, 45 are moved towards each other and vice-versa during rotation of the rod 46 in the other direction the stops 44, 45 are moved away from each other. With this arrangement, movement of the governor 19 is not transmitted through the lever 30 to the link 31 as long as the intermediate point 43 of the levers 30 is free to move up and down between the stops 44 and 45. If, however, the lever 30 has been turned in one direction to engage one of the stops 44 or 45, then further turning movement of the lever 30 in the same direction will effect transmission of the movement to the link 31 and from there through the levers 32, 35 and the hydraulic motor 41 to the valve 11. Engagement between the lever 30 and one of the stops 44, 45 takes place only if the speed has been decreased or increased a certain value. Hence, with this arrangement the speed governor 19 acts directly on the turbine valve 11 when the load on the turbo-generator has dropped or increased a certain value. This certain value depends upon the setting of the stops 44 and 45 and it may be increased or decreased by moving the stops 44, 45 away or towards each other respectively. The right hand end of the lever 30 and the levers 32, 35 are normally held in position by means of a spring 48 which, as shown in the drawing, is arranged to assist movement of the link 31 in upward and in downward direction.

As pointed out above, the control of the turbine valve 11 is normally effected by the load governor 18 either directly in response to small load changes in the main line 15 or indirectly through speed changes of the governor 19. Small load changes in line 15 which do not affect the frequency of the line also do not affect the speed of the turbo-generator but such small changes effect movement of the load governor 18 and through it movement of the turbine valve 11. Greater load changes in the line 15 effect speed change of the turbo-generator and consequently of the speed governor 19 which in turn causes movement of the turbine valve through the intermediary of the load governor 18. Details of the load governor itself do not form a part of my invention and therefore this governor is shown diagrammatically only. This load governor includes a lever 50 rotatable on a fulcrum 51 against the biasing force of a pair of normally balanced springs 52 and 53. These springs as indicated are connected at one end to the lever 50 at points opposite the fulcrum 15 and at their other end to cords 54 movably supported on rollers 55. The left hand end of the lever is connected to the piston of a dashpot 56 having an adjustable by-pass 57 to dampen movement of the lever 50. The lever is subject directly to load changes in the main line 15. This, as diagrammatically indicated, is effected by a solenoid having a core 58 connected to the lever 50 and biased in upward direction by a tension spring 59. The solenoid has an energizing coil 60 which is connected to a device 61 responsive to load changes in the line 15. With this arrangement, an increase in load in the line 15 causes downward movement of the core 58 and consequently clockwise turning movement of the lever 50 about its fulcrum 51. Movement of the lever 50 is limited by stops 62. The right hand end of the lever 50 is pivotally connected to a pilot valve 63 for a hydraulic motor 64. The motor, as shown in the drawing, has a piston 65 movably disposed in a cylinder 66 and biased in downward direction by a compression spring 67. Fluid under pressure is conducted to the lower part of the cylinder by a conduit 68. The piston is connected to a hollow stem 69 which concentrically surrounds the stem of the pilot valve 63 and has an opening 70 through which operating fluid normally is discharged from the cylinder. Thus, during normal operation fluid under pressure is supplied to the space below the piston 65, whence it is discharged through an opening in the piston 65, which opening is controlled by the pilot valve 63. The fluid passing this opening flows through the hollow piston 69 to be discharged through an opening 70. The right hand end of the lever 50 projects through the opening 70 and, as stated above, is connected to the pilot valve 63. The upper end of the hollow stem 69 is connected by a link 71 to the left hand end of a lever 72 connected at its right hand end to the aforementioned link 33. The arrangement just described serves for controlling the turbine valve during small load changes in the main line 15. Means are provided for amplifying the movement of the hollow stem 69 in case considerable load changes in the main line 15 take place. These means include a hydraulic motor 73 with a piston 74 having a stem 75 connected to an intermediate point of the lever 72. Operating fluid under pressure is supplied to the hydraulic motor 74 by a pilot valve 76 connected at its upper end to the right hand end of an arm 77 which at its left hand end is rigidly secured to the hollow stem 69. The pilot valve 76 has a port 78 and a valve member 79 overlapping said port. The pilot valve port is connected to the hydraulic motor 73 by a conduit including a valve 80.

During operation an increase in load, as pointed out above, causes downward movement of the right hand end of the lever 50, thereby causing an increased flow of operating fluid from the hydraulic cylinder 66 through the hollow stem whereby the pressure in the lower portion of the cylinder is reduced and the piston 65 is forced downward by the action of the spring 66. Downward movement of the piston 65 with its stem 69 causes counterclockwise turning movement of the lever 72 about its connection with the piston stem 75. This causes upward movement of the link 33 and the links 34 and 38, resulting as stated above in closing movement of the turbine valve 11. Vice-versa, if the load in the main line 15 drops, the mechanism operates to effect opening movement of the turbine valve 11. Under the condition just described the auxiliary hydraulic motor 73 with its pilot valve 76 remains inoperative owing to the fact that the pilot valve head 79 overlaps its port 78.

In case of considerable load changes in the main line 15 the lever 50 is turned until it engages one of the stops 62. Under these conditions the pilot valve head 79 is moved a considerable distance to open its port and to effect supply of fluid to or discharge of fluid from the hydraulic motor 73. More specifically, if the lever 50 is turned upward to engage the stop 62 during a considerable decrease in load in the main line 15, the pilot valve 63 closes its port and causes considerable upward movement of the hollow stem 69 whereby the auxiliary pilot valve 79 is moved upward to uncover its port and to permit the discharge of operating fluid from the hydraulic motor 73 whereby the piston 74 is forced downward, causing downward movement of the right-hand end of the lever 72, resulting in opening movement of the turbine valve 11. This causes an increase in speed of the turbine 10 and an increased output of the generator whereby the original flow of energy to the line 15 is re-established.

In order to effect valve control in response to speed changes of the speed governor 19 through the intermediary of the load governor 18, it is necessary to provide connecting means between the speed governing mechanism and the load governing mechanism. This connecting means in the present instance includes a hydraulic cylinder 81 with a piston 82 movably disposed therein and held between two compression springs 83 and 84 respectively. The piston 82 is secured to a stem 85 which at its upper end is connected to the left-hand end of a floating lever 86 pivotally connected at its right-hand end by a link 87 to the left-hand end of the lever 30. The stem 85 has an extension which at its lower end is connected to the left-hand end of a lever 88. The latter is connected at its right-hand end to the cord 54 and has an intermediate point supported on an adjustable fulcrum 89. This fulcrum includes a nut secured to the lever 88 and held on a screw-threaded rod 90 which may be rotated in either direction by means including a worm gear 91. Fluid may be supplied to the upper or lower space of the hydraulic cylinder 81 by means including a pilot valve 92 having valve heads 93 connected to an intermediate point of the floating lever 86.

During operation an increase in speed causes upward movement of the left-hand end of the lever 30, which latter normally turns about its pivotal connection with the link 31. This turning movement of the lever 30 effects through the link 87 and the floating lever 86 upward movement of the pilot valve heads 93 whereby fluid under pressure is supplied to the upper space in the hydraulic cylinder 81 and discharged from the lower space thereof, resulting in downward movement of the piston 82 whereby the lever 88 is turned in counter-clockwise direction about its fulcrum 89. Upward movement of the right-hand end of the lever 88 then causes clockwise turning movement of the lever 50 about its fulcrum 51 which, as described above, results in closing movement of the turbine valve 11. The hydraulic cylinder 81 has a by-pass 94 with a valve 95 provided between conduits connecting said hydraulic cylinder to the pilot valve 92. The hydraulic cylinder 81 thus may be rendered inoperative by opening the valve 95. This makes it possible to render the speed governor 19 inoperative, that is, to prevent movement of the speed governor to be transmitted to the load governor, the speed governor under such condition becoming operative only when the speed changes beyond a certain value to effect engagement between the lever 30 and one of the stops 44, 45.

The aforementioned adjustable fulcrum 89 for the lever 88 permits adjustment of the turbine load. In case the load in line 15 should drop considerably, as may happen if a switch in line 15, for instance switch 14, is opened for some reason, then the load governor normally would operate to open the turbine valve 11 and in this case slowly open said valve completely. This, however, is prevented by operation of the speed governor which in case of a certain increase in speed causes upward movement of the lever 30 until the latter engages the stop 45 and effects downward movement of the rod 31, resulting in closing movement of the turbine valve 11. Thus, the speed governing mechanism controls closing movement of the turbine valve in case the load in the main line 15 should drop below a certain value.

With my invention I have accomplished an improved construction and arrangement for control mechanisms to control an element of a prime mover driving a generator connected to a main line and a secondary line whereby the load in the main line is maintained constant and supply to the secondary line is maintained in case of failure of the main line. My control mechanism broadly includes first means including a load governor responsive to load changes in the main line for controlling the prime mover, and second means including a speed governor and stop means for directly controlling the prime mover if the speed of the governor increases beyond or below a certain value. Said stop means are associated with a lever connected to the governor and permitting movement of the lever by the action of the governor without directly transmitting such movement to the prime mover. In addition, my governing mechanism includes a third means for normally transmitting movement of the speed governor from said second means to the first means, in other words, for effecting indirect control of the prime mover by the action of the speed governor through the intermediary of the load governor. The arrangement of the governing mechanism is such that control of the prime mover may be effected either by the speed governing mechanism or the load governing mechanism or both. Either one of the first or second means may be put out of operation without affecting operation of the other means.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States, is:

1. Prime mover control mechanisms including the combination of first means including a load governor for controlling a prime mover, second means including a speed governor for directly controlling such prime mover when the speed changes a certain value above or below normal speed, and third means connecting the first and the second means to effect prime mover control by the speed governor through the intermediary of the first means.

2. The combination of a prime mover having a valve, an electric generator driven by the prime mover, a main line and a secondary line connected to the generator, and a control mechanism for the valve, said control mechanism including first means including a load governor responsive to flow of energy in the main line for effecting movement of the valve, second means including a speed governor driven from the prime mover for directly effecting movement of the valve when the prime mover speed changes beyond a certain value, and means connecting the second means to the first means to effect movement of the valve in response to speed changes of the prime mover through the intermediary of the load governor.

3. The combination of a prime mover driven electric generator, a control element for the prime mover, an electric line connected to the generator, and a control mechanism for controlling said element comprising first means including a load governor responsive to load changes in the line and second means including a speed governor driven by the prime mover, a lever connected to the speed governor and movable in response to speed changes and stops associated with the lever to act as fulcrums when the speed changes beyond certain values above and below normal speed.

4. The combination of a prime mover driven electric generator, a control element for the prime mover, an electric line connected to the generator, and a control mechanism for controlling said element comprising first means including a load governor responsive to load changes in the line, second means including a speed governor driven by the prime mover, a lever connected to the speed governor and movable in response to speed changes and stops associated with the lever to act as fulcrums when the speed changes beyond certain values above and below normal speed in order directly to transmit movement of the speed governor to said element, and means connecting the lever to the load governor to transmit movement of the speed governor through the intermediary of the load governor to said element as long as the speed changes within fixed values.

5. The combination of a prime mover driven electric generator, a control element for the prime mover, an electric line connected to the generator, and a control mechanism for controlling said element comprising first means including a load governor responsive to load changes in the line, second means including a speed governor driven by the prime mover, a lever connected to the speed governor and movable in response to speed changes and stops associated with the lever to act as fulcrums when the speed changes beyond certain values above and below normal speed in order directly to transmit movement of the speed governor to said element, means connecting the lever to the load governor to transmit movement of the speed governor through the intermediary of the load governor to said element as long as the speed changes within fixed values, and means rendering said connecting means inoperative.

6. The combination of a prime mover having an element for controlling the flow of operating fluid thereto, an electric generator driven by the prime mover, a main line and a secondary line connected to the generator, and a governing mechanism for maintaining constant the flow of electric energy from the generator and the secondary line to the main line at varying load demand from the secondary line, said governing mechanism comprising means including a load governor for normally controlling said element in response to changes in flow of energy in the main line, and means including a speed governor for controlling said element in response to considerable load changes in the main line and to counteract operation of the load governor upon failure of the main line.

ARNOLD MAAS.